United States Patent [19]

Mustered

[11] 4,117,905
[45] Oct. 3, 1978

[54] STEERING SYSTEM FOR ARTICULATED VEHICLES

[75] Inventor: Lyle V. Mustered, Streator, Ill.

[73] Assignee: Anthony Company, Streator, Ill.

[21] Appl. No.: 743,621

[22] Filed: Nov. 22, 1976

[51] Int. Cl.² ............................................. B62D 5/10
[52] U.S. Cl. ...................................... 180/139; 60/484
[58] Field of Search ............... 180/139, 134, 135, 136, 180/137, 138, 51, 152, 153; 60/384, 484

[56] References Cited

U.S. PATENT DOCUMENTS

| | | | |
|---|---|---|---|
| 2,614,644 | 10/1952 | Gustafson | 180/138 |
| 3,482,398 | 12/1969 | Christensen | 180/152 X |
| 3,905,438 | 9/1975 | Runyon et al. | 180/153 X |

FOREIGN PATENT DOCUMENTS

| | | | |
|---|---|---|---|
| 1,655,927 | 3/1971 | Fed. Rep. of Germany | 180/152 |
| 1,901,588 | 8/1970 | Fed. Rep. of Germany | 180/139 |
| 1,942,086 | 3/1971 | Fed. Rep. of Germany | 180/139 |

*Primary Examiner*—John A. Pekar
*Attorney, Agent, or Firm*—Alter and Weiss

[57] ABSTRACT

A steering system for articulated vehicles having two or more pivotally connected vehicle modules. The invention provides for such a vehicle a dual hydraulic power steering system cooperating with a plurality of telescoping hydraulic cylinders to initiate steering about the pivot point connecting the two or more vehicle modules. Auxiliary, emergency, and back-up steering capabilities are imparted through the use of independently operated double-acting cylinders on both sides of the vehicle pivot attachment, with one hydraulic power system supplementing or replacing the other in case of failure. A series of pumps, accumulators, reservoirs, and other associated hydraulic elements cooperate with the synchronized valve metering construction to accomplish steering of the vehicle.

21 Claims, 4 Drawing Figures

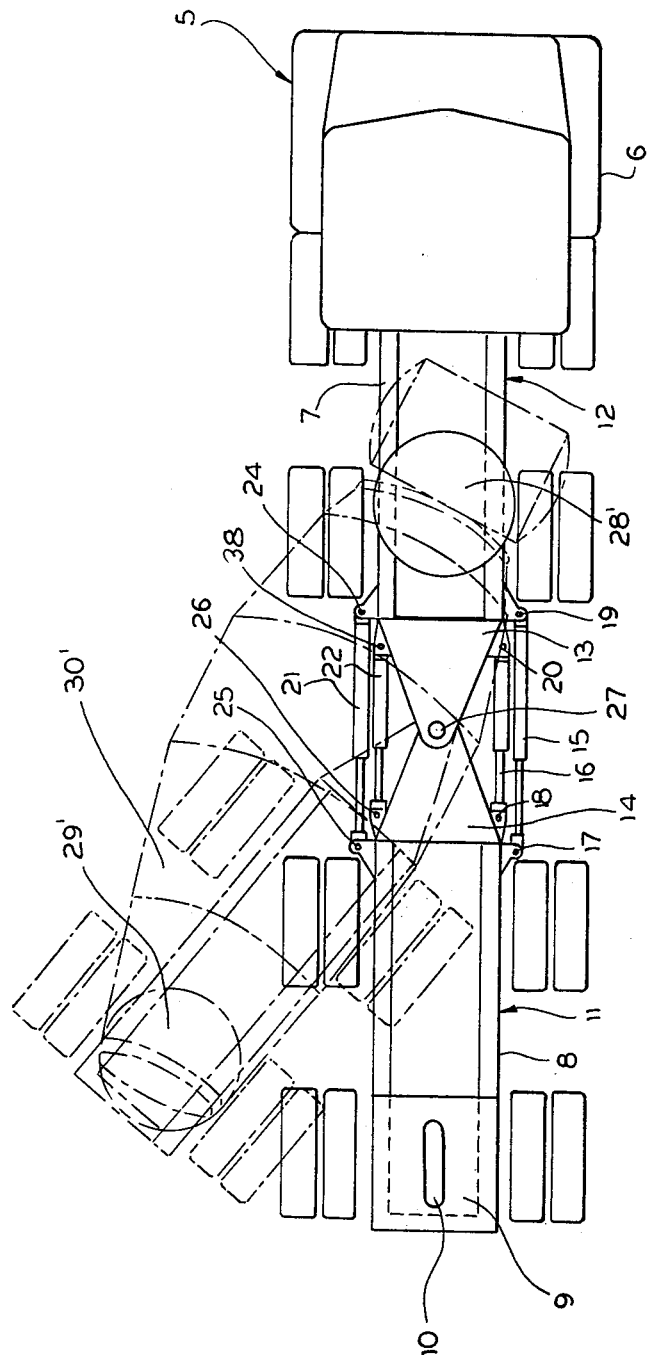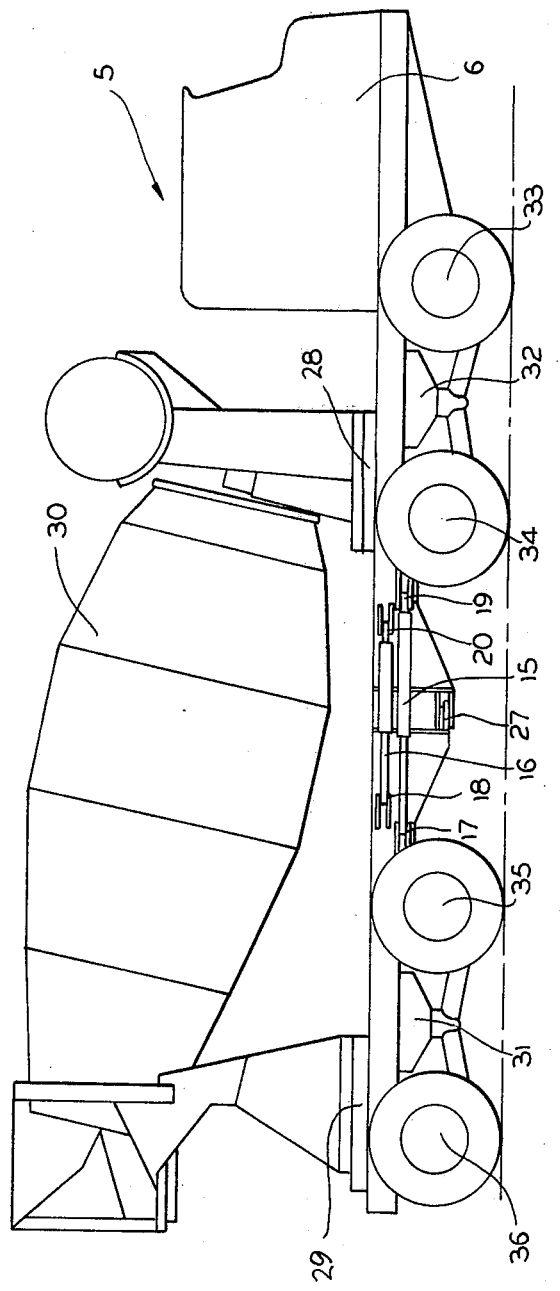

STEERING SYSTEM FOR ARTICULATED VEHICLES

BACKGROUND OF THE INVENTION

The present invention relates, in general, to vehicular and/or automotive steering devices and in particular to a dual hydraulic steering system for articulated transport vehicles.

While the vast majority of conventional transporting vehicles in utilization today comprises tractor-trailer combinations, utilizing conventional Ackerman steering assemblies, there has more recently been development and utilization of articulated type transporting vehicles which avoid utilization of this typical type of conventional steering. With such a vehicle, and the avoidance of conventional Ackerman steering, many maeuverability problems of the conventional vehicle are avoided. Articulated vehicles, for the most part, reduce the problems of conventional vehicles associated with getting stuck in mud, or becoming entrapped in loose earth, sand, bog, snow, or piles of litter often encountered in refuse dumps. Additionally, articulated vehicles frequently have the ability to "walk out" of tire track ruts and soft terrain, and, due to their articulation, have smaller and sharper turning radii and improved handling, to mention but a few advantages.

The conventional Ackerman steering mechanisms provide difficulties in other areas also. The reliance upon the two or more front wheels of the front cab portion of the conventional tractor-trailer transport vehicle requires swivelling in order to change the direction of the vehicle. The vast amount of mechanical cooperating elements in which pumps, reservoirs, and hydraulic components are combined with energy wasting mechanical linkages, extraordinary and often complex, gear assemblies and the like, further increase the power consumption of such conventional steering units. Unless increased power is consumed through the addition of a power steering unit, such conventional type steering on transport vehicles, often provide difficult-to-handle and somewhat overwhelming steering control problems.

As an alternative to these conventional tractor-trailer configurations, the articulated vehicles mentioned above have been utilized, as disclosed in Kamner U.S. Pat. No. 3,515,235. It should be realized, however, that the Kamner invention depends upon a combination of both conventional Ackerman and hydraulic-articulated steering means to somewhat reduce the turning radius and improve the maneuverability in such vehicles. Similarly, articulated vehicles, such as those disclosed in Robinson et al., U.S. Pat. Nos. 2,933,143; Starkey, 2,271,808; Lindell, 3,771,141 and McGee, 3,834,480, all describe various interpretations or articulated steering systems.

While the advantages of articulated vehicles utilizing articulated steering means are obtained through many of these references, their reliance upon single powered steering systems offers disadvantages to these inventions. None of these inventions, for example, utilizes a totally hydraulic articulated steering system with an equivalent total hydraulic steering system for back-up, emergencies, and for supplementary additional steering power. Additionally, few if any of the references utilize a true and total hydraulic articulated steering system without dependence upon additional mechanical linkages to accomplish steering, and thus these references provide for systems in which mechanical linkage drag and power loss are still involved with the steering system.

Neither of the existing art inventions identified above provides for emergency steering or back-up steering power with a second system in case one system has a failure, nor discloses the use of the dual steering system in which both of the two steering systems provide more than normal steering power for the vehicle, imparting to the vehicle a more controllable steering system which is more reliable to its user.

It is thus an object of the present invention to provide a dual hydraulic steering system for articulated vehicles in which each component of the dual system provides for emergency steering or back-up steering power for the other component in case the first fails, or is associated with a telescoping hydraulic cylinder which fails.

It is also an object of the present invention to provide a steering system in which both components of the steering system are synchronized to operate effectively together, towards providing more than normal steering power for the vehicle in the absence of emergency situations, and which, at the same time, provides improved and more stable control of the vehicle.

Additionally, it is an object of the present invention to provide a dual steering system controlled by a common steering wheel in which each system either has totally independent power circuity directed to particular steering cylinders, or has independent power components which rely upon other shared hydraulic components to appropriately segregate the hydraulic operation of each, and accordingly provide the back-up, emergency, and auxiliary steering power outlined above.

It is further an object of this invention to provide a more reliable steering system for articulated vehicles which are equipped with warning devices to alert an operator in the event of system failure, while at the same time, providing safe hydraulic steering without mechanical linkages so as to reduce mechanical linkage drag and power loss. At the same time, it is an object of this invention to eliminate the need for steering axles which hinder performance and to provide this safe steering to an articulated vehicle, so as to enable such a vehicle to "walk through" soft terrain, steer more easily, to require less manual effort on the part of the operator, to improve the turning radius of the vehicle, and, in general, to improve the maneuverabiliyy of the vehicle and its associated load.

These and other objects of the invention will become apparent in light of the following disclosure.

SUMMARY OF THE INVENTION

The present invention is a steering system for articulated vehicles of the type having two or more vehicle modules pivotally connected to one another at a pivot attachment point. While the particular type of articulated vehicle upon which the present invention may be utilized is irrelevant, an articulated vehicle having two modules for the transportation and support of various types of containers is disclosed in a copending application filed on my behalf.

The present improved steering system comprises steering actuation means, and two or more hydraulic telescoping steering means, each of which is positioned proximate to the pivot attachment point of the articulated vehicle with at least one of the two or more hydraulic steering means positioned on a first side of this pivot attachment point and another of the hydraulic telescoping steering means positioned on the first or second side of the pivot attachment. Dual metering control means are operably connected to the steering actuation means to control and synchronize the hydraulic power to and operation of the plurality of hydraulic telescoping steering means. The specific type of dual metering control means utilized can comprise dual fluid flow or fluid divider devices, as well as synchronized valve assemblies. Further, two or more hydraulic power circuit means are utilized in the system and are operably connected with the dual metering control means.

The first of these two or more hydraulic circuitry path means powers at least one of the two or more hydraulic steering means proximate the pivot attachment, and the second of the two or more circuitry path means powers at least one of the hydraulic steering means proximate the pivot attachment. This arrangement provides independent hydraulic power means to power certain of the several hydraulic telescoping steering means, all of which are synchronized through the dual metering control means to cooperate with one another and thus effectuate steering of the articulated vehicle.

In the preferred embodiment of the invention, the first of the circuit path powers, in addition to the hydraulic cylinder on the first side of the attachment pivot, at least one hydraulic cylinder on the second side of the same pivot attachment. Equivalently, the second of the two or more hydraulic circuitry path means also powers at least one hydraulic steering means or telescoping cylinder on the first side of the pivot attachment. Thus, in this preferred embodiment, each hydraulic power circuit controls at least one hydraulic cylinder on each side of the pivot attachment to accordingly provide optimal auxiliary power for steering as well as appropriate emergency or back-up steering capability. In such an embodiment, the hydraulic telescoping steering means will comprise, for example, four hydraulic double-acting cylinders. A first and second of these double-acting cylinders are positioned on the first and second side respectively, of the pivot attachment point on the vehicle and are powered by the first hydraulic power circuit path means. The third and fourth of these hydraulic double-acting cylinders are positioned on the first and second side respectively also, and are equivalently powered by the second hydraulic power circuit path means.

In yet another embodiment of the invention, the hydraulic telescoping steering means comprises two hydraulic double-acting cylinders instead of four. The first of these two double-acting cylinders is positioned on the first side of the pivot attachment point and is powered by the first hydraulic power circuit. The second of these two hydraulic double-acting cylinders is positioned on the second side of the pivot attachment point and is powered by the second hydraulic power circuit. In such an embodiment, it is preferred that both the first and second hydraulic cylinders are of a relatively substantial size so as to enable steering of the vehicle by only one of the cylinders when the independent hydraulic circuit path powering the other cylinder, or the other cylinder itself, fails, or an other equivalent emergency situation might arise. Additionally, because of rod end displacement differentials, a smaller assist-cylinder may be linked with each of the two main cylinders to counteract rod end power displacement.

It should be realized, however, that in both embodiments heretofore discussed, each of the two or more hydraulic telescoping steering means utilized comprises a double-acting telescoping cylinder. As can be easily realized, through such double-acting cylinders, steering can be effectuated by extending the hydraulic piston on one side of the pivoted attachment point and contracting the pivoting arm of the telescoping cylinder on the opposite side of the pivoted attachment point.

In the preferred embodiment, each of the two or more hydraulic circuit path means has warning indicator means associated therewith to apprise the user of the vehicle of any malfunctions and failures which might arise in either of the hydraulic circuit path means. Through such a device, the operator will appropriately realize that the vehicle is operating only on the emergency or back-up hydraulic system, both for the purposes of repairing the defective system and for identifying the reason for potential steering efficiency losses. Relative to any of the hydraulic circuit systems herein discussed, actual effectuation of steering is accomplished through the steering actuation means which, in the preferred embodiment, comprises a substantially conventional steering wheel and steering column assembly so as to provide more accustomed steering features for the user.

Likewise, in the preferred embodiment of the invention, the dual metering control means comprise two individual metering control valves, each of which is operably connected between each of the hydraulic circuit power paths and the hydraulic telescoping steering means respectively which are powered by the hydraulic circuitry power path means. In one embodiment, each of these two meter control valves are adjoined longitudinally in tandem for simultaneous adjustment by the steering actuation means. In yet another embodiment of the invention, each of the two meter control valves are independently positioned alongside one another. The steering actuation means are operably connected to each of the control valves through steering divider means interposed therebetween. These steering divider means communicate adjustment of the steering actuation means to each of the meter control valves to, in turn, adjust each of these two meter control valves simultaneously. Such a steering divider apparatus would comprise a gear, belt, chain, or other motion-transmitting mechanism, or "transmission" type device between the steering actuation means and the meter control valves.

The two or more hydraulic circuitry paths comprise dual circuit fluid power systems, each circuit of which is operably connected to one of the dual metering control valves respectively, so as to power the respective associated hydraulic telescoping steering cylinder or cylinders. Each of the circuits of the dual circuit system is independently operable of the other, thereby providing to the steering system, emergency, back-up, and auxiliary steering power and each of the individual independent circuits comprise reservoir means, pump means and accumulator means operably connected into a series fluid circuit arrangement.

In the preferred embodiment of the invention, this particular type of circuitry further includes filter means which is also operably disposed in a series within the circuit, check valve means which are disposed about the accumulator to control the fluid direction in and out of the accumulator means and pressure relief valve means which are placed in parallel arrangement with the pump means to protect the pump during operation.

The two or more hydraulic circuitry paths, in yet another embodiment, comprises a dual circuit power system which is equivalently connected to one of the dual metering control valves respectively so as to also power the resspective hydraulic telescoping steering cylinder or cylinders. In this embodiment, however, each of the circuits of the dual circuit system is partially independent of the other to similarly provide to the steering system emergency back-up and auxiliary steering power. In this power circuit arrangement, however, each of the circuits has independent accumulator means which are operably connected to "shared" reservoir and pump means connected to the independent circuits through a series of fluid circuit arrangements. Also, in this embodiment, each partially independent circuit of the circuit fluid power system has check valve means disposed about each accumulator to control the fluid direction in and out the accumulator means and the two circuits additionally share filter means which are operably disposed in a series arrangement within the shared portion of the circuit fluid power system, as well as pressure relief valve means which are disposed in parallel with the shared pump means to protect the pump means in operation.

BRIEF DESCRIPTION OF THE DRAWINGS

FIG. 1 of the drawings is a top plan view of an articulated vehicle, showing pivotal attachment of the vehicle modules as well as the articulated steering means of the present invention;

FIG. 2 of the drawings is a side elevational view of the vehicle of FIG. 1, illustrating the invention thereof;

DETAILED DESCRIPTION OF THE DRAWINGS

Figure 3:
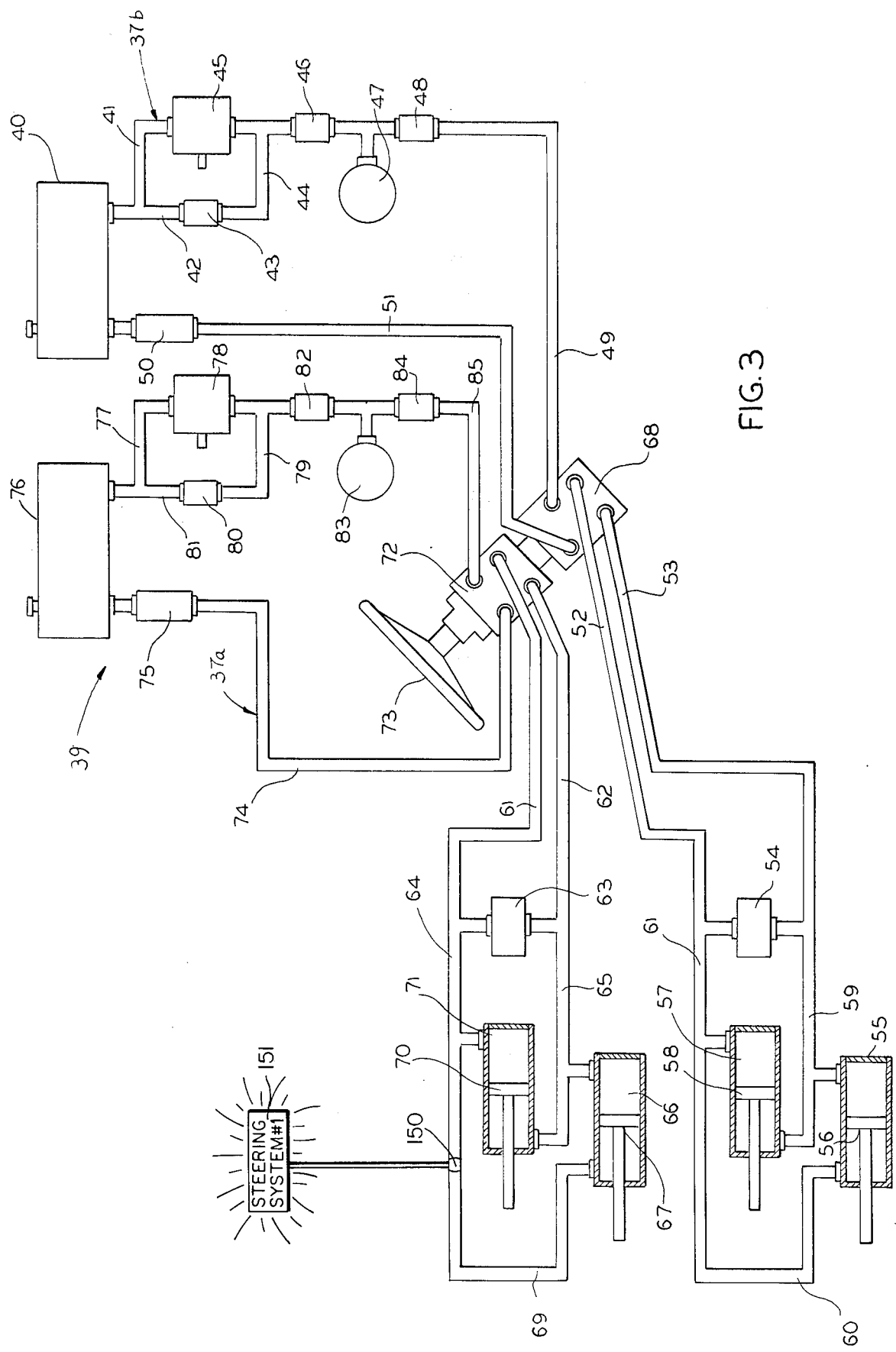
FIG. 3 is a schematic illustration of one embodiment of the hydraulic circuit path means utilized in the present invention, particularly showing the utilization of two independent power circuits in cooperation with the dual metering control valves and, in turn, the two pairs of hydraulic telescoping cylinders.

While this invention is susceptible of embodiment in many different forms, there is shown in the drawings and will herein be described in detail, several specific embodiments, with the understanding that the present disclosure is to be considered an exemplification of the principles of the invention and is not intended to limit the invention to the embodiments illustrated.

Articulated vehicle 5 is shown in FIG. 1 as generally comprising vehicle modules 11 and 12 pivoted at pivot attachment point 27 through module extensions 14 and 13 respectively. A vehicle of this particular type utilizes frame 7 of vehicle module 12 to which is attached container support pivot 28' upon which container 30' (in this case a rotating cement mixer) is pivotally supported. Further, in order to enable turning of the vehicle and thus pivoting at attachment point 27, frame 8 of vehicle module 11 has attached thereto, support platform 9 with slotted means 10, which enables pivot support 29' to slide during a turn when pivoting of the two modules 11 and 12 occurs. Sliding can also be accomplished through other means which combine rotary and travel motions. Also shown in FIG. 1 are hydraulic telescoping steering cylinders 15, 16, 21 and 22. Telescoping cylinder 15 is pivotally attached to vehicle module 11 at pivot 17 and, in turn, to module 12 at pivot 19. Equivalently, cylinder 16 is attached at pivots 18 and 20 between the two modules, as is cylinder 22 at pivots 26 and 38; and cylinder 21 between pivots 25 and 24. It should be noted that in the particular articulated vehicle illustrated, control portion 6 of the vehicle 5 is located on vehicle module 12 and comprises that part of the vehicle in which the steering actuation means, as well as all other controls are located.

Articulated vehicle 5 is also shown in FIG. 2 in which cement truck container 30 is supported by pivoting support means 28 on the forward vehicle module and by support pivot 29 on the rear vehicle module. Also shown in this particular figure are driver control portion 6, suspension 31 and 32 and wheel assemblies 33 through 36.

FIG. 2 more adequately discloses the postioning of telescoping cylinder 16, and associated pivot points 18 and 20, over the position of cylinder 15 and its associated pivot points 17 and 19.

One embodiment of the dual hydraulic circuit path 39 for driving particular telescoping cylinder 55, 57, 66 and 71 is shown in FIG. 3. This particular embodiment utilizes a dual power circuit comprising two substantially independent integrated hydraulic power circuits which are appropriately routed through dual metering valves 72 and 68 for powering cylinders 55, 57, 66 and 71. As can be clearly seen steering actuation means 73 operates to adjust individual metering control valves 72 and 68, which are adjoined longitudinally in tandem for simultaneous adjustment by steering wheel 73.

The first of these hydraulic power circuit paths 37a is that which is associated with meter control valve 72. Independent circuit 37a functions as a separate and autonomous hydraulic power circuit from metering valve 72 through circuit portion 74, filter 75, reservoir 76, pump 78 and accumulator 83, for channelling hydraulic fluid through remaining circuit 85 and in turn through metering valve 72 for distribution through circuit 61 or 62, to telescoping cylinders 71 and 66. It should be noted that pressure relief valve 80 is connected in parallel with pump 78 through circuit paths 81 and 77 and basically protects pump 78 during operation of the power circuit. Further, check valves 82 and 84 about accumulator 83, enable uni-directional flow to accumulator 83 in the appropriate direction and out from accumulator 83 to metering valve 72.

Accumulator 83 is used for several purposes in each of the independent power circuits. Since in some operations it is necessary to maintain the hydraulic system under a controlled pressure for a long period of time, a small internal or external leak could greatly decrease the required pressure. Through the use of accumulator 83, this leakage would be compensated for and pressure maintained within an acceptable range for long periods of time. In the same manner, the accumulator 83 can compensate for thermo expansion and contraction of the liquid due to variations of temperature. Additionally, the accumulator enables the absorption or cushioning of shock and surges in the hydraulic circuit which are caused by the pulsating fluid delivery from pump 78, and helps sponge surges caused by liquid flowing at a high velocity in a pipe which is stopped suddenly by the closing of a valve, so as to reduce the instantaneous pressures developing within the operating system. The accumulator further assists pump 78 in the independent circuit by eliminating the requirement to incorporate an extremely large pump to handle large volumes of liquid for short periods of time. Since it is not economical to incorporate such a pump in the system for only intermittent usage to supply these high volume applications, an accumulator is utilized to store up the desired volume of liquid to aid the pump during these peak demands. Similarly, the energy stored in accumulator 83 may be used to actually power the appropriate telescoping cylinders in the event of normal hydraulic system failure. For example, efficient energy can be stored in accumulator 83 for several applications of hydraulic cylinders 71 and 66 in the case of a pump failure.

In an equivalent manner, independent circuit 37b is utilized through metering control valve 68 to effectuate operation of cylinders 55 and 57. Fluid is cycled through circuit 51, filter 50, reservoir 40, pump 45 and accumulator 47, and through circuit 42 to second metering control valve 60 for distribution to telescoping cylinders 55 and 57. As utilized in the equivalent hydraulic circuit power system 37a, pressure relief valve 43 is connected in parallel with pump 45 through circuits 41, 42 and 44 and check valves 46 and 48 are disposed within the circuit to appropriately define directions of flow for fluid passing through or utilized by accumulator 47. Upon return to metering valve 68 through circuit 49, the fluid is distributed under pressure as desired through telescoping circuitry 52 or 53.

As discussed, hydraulic fluid under pressure generated by hydraulic circuit power path 37a is distributed through metering control valve 72 for appropriate transmittal, as desired, to telescoping cylinders 71 and 66 in a closed hydraulic circuit arrangement. In the embodiment of the invention in which two hydraulic telescoping cylinders are located on each side of the pivot attachment between the vehicle modules, telescoping cylinder 71, for example, would be on the first side of the attachment point and cylinder 66 would be on the second side of the attachment point. Thus, when the fluid under pressure is routed through circuit 62 and controlled by dual relief valve 63, it is directed to one side of double-acting cylinder 66 so as to expand the piston and arm outwardly and to the other side of cylinder 71 to compress telescoping arm 70 inwardly to accordingly generate steering. Thus, if the first side of the pivotal attachment was the left side and the second side comprises the right side of the pivot attachment point, transmittal of pressurized fluid through circuit 62 and circuit 65 would turn the vehicle to the left. Alternatively, routing of the pressurized fluid through circuit path 61, 64 and 69, would power telescoping cylinder 71 with piston 70 to expand longitudinally while compressing piston arm 67 of cylinder 66 to accordingly accommodate a right-hand turn.

As steering actuation means 73 is turned it simultaneously controls metering control valves 68 and 72. Accordingly, at the same time that cylinders 66 and 71 are activated, cylinder 55 with piston 56 and cylinder 57 with piston 58 are similarly and equivalently actuated. Assuming for example that cylinder 57 is located on the first side, or left side of the pivot attachment of the articulated vehicle, and cylinder 55 is located on the second side, or right side of the articulated vehicle, pressurised fluid transmitted to circuit 53 under control by dual relief valve 54, is circuited through circuit portion 59 to contract the telescoping arm of cylinder 57 while at the same time expanding the telescoping arm on cylinder 55 in a synchronized relationship to the expansion of arm and piston 67 on the cylinder 66. Thus, the two cylinders and arms on a given particular side of the pivot attachment point, operate to expand or contract in the same direction simultaneously and work together toward providing more than normal steering power for the vehicle. When circuit 52 is transmitting pressurized fluid to cylinders 55 and 57, cylinder 57 on the left side of the vehicle expands, and cylinder 55 on the right side of the vehicle contracts to accommodate a right turn for the articulated vehicle. The circuitry connected with the telescoping cylinders which are not transmitting the pressurized fluid return spent fluid from the cylinder to the metering control valve for reentry into their respective circuit paths 37a or 37b. Additionally, circuit monitor 150 in circuit path 69 is shown connected to warning indicator means 151 to apprise a user of steering circuit malfunctions.

Figure 4:
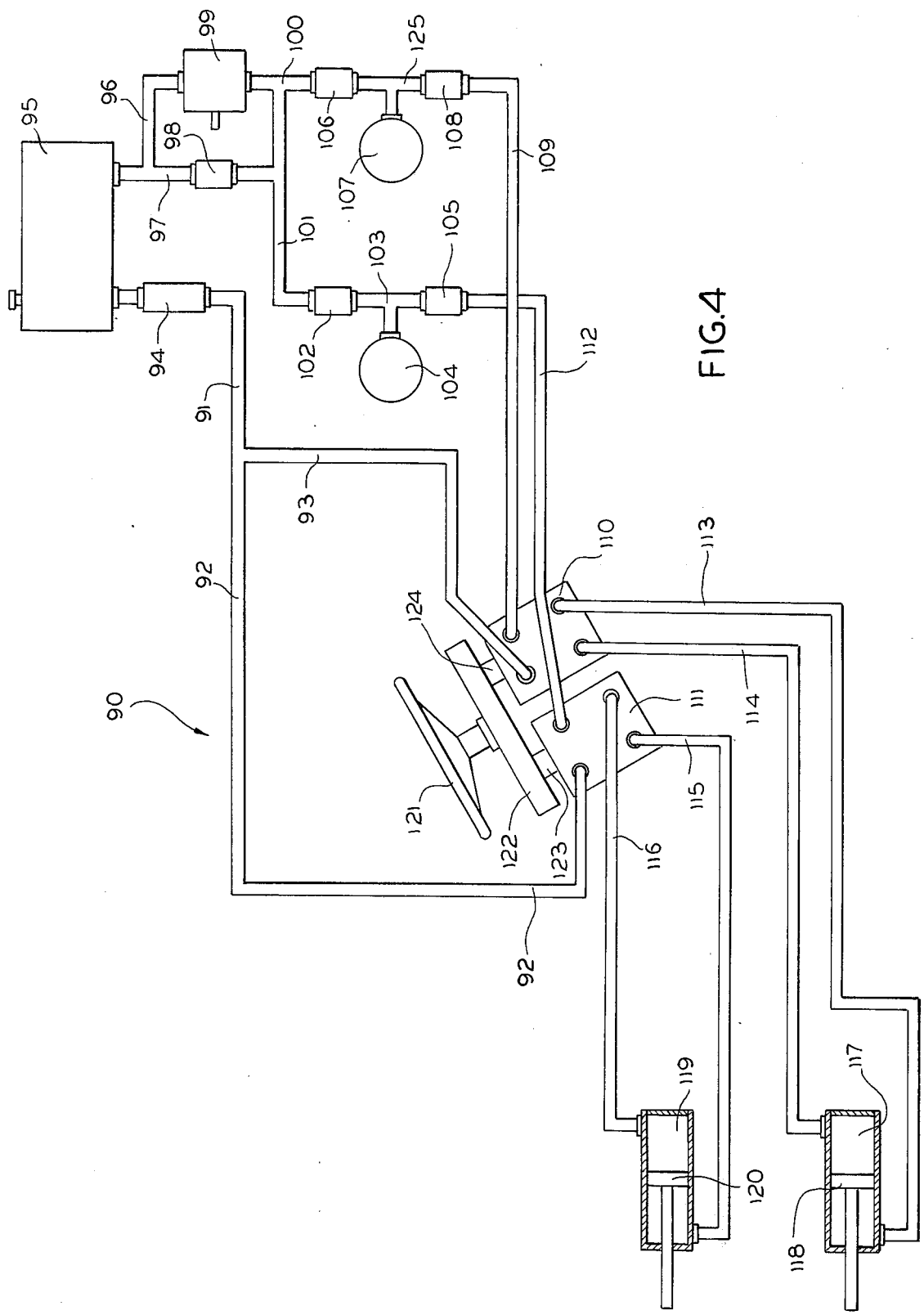
FIG. 4 is a schematic illustration of yet another embodiment of the hydraulic circuit path means of the present invention, particularly illustrating the utilization of partially independent hydraulic power paths which share other hydraulic componentry and which, through a dual metering valve, cooperate with a first and second hydraulic telescoping cylinder to effectuate steering of the vehicle.

Additional embodiments of the dual hydraulic power circuit path and hydraulic steering apparatus are shown in FIG. 4. In this particular embodiment, steering actuation means 121 is connected by steering driver means 122, which acts as a belt, chain, or gear transmission to impart adjustment from steering wheel 121, to metering valves 110 and 111 through transmission connections 123 and 124 respectively.

In the particular fluid power path circuit embodiment shown in FIG. 4, instead of relying upon two independent hydraulic power systems, only partially independent hydraulic power systems are utilized. Thus, circuit 101, having check valve 102, accumulator 104 and check valve 105 for the proper directional control of the pressurized fluid, acts as an independent power path, together with second power path 100 having check valve 106, accumulator 107 and check valve 108.

Both these partially independent power paths rely upon shared hydraulic components for effective operation. Thus, a single circuit 92, working with circuit 91, filter 94, reservoir 95 and pump 99, provides for cleaning, storage, and pressurization of the hydraulic fluid contained within for utilization by the separate accumulator paths. As was similarly shown in FIG. 3, pressure relief valve 98 has been connected in parallel arrangement through circuits 96 and 97 with pump 99 to protect the pump in the operation of the hydraulic circuit path. It should be clearly noted that utilization of separate accumulator means retains for the hydraulic system beneficial independent reliance on separate accumulators to provide the functions previously outlined for each of the respective powered cylinder arms, even though pump means, filter means, and reservoir means are shared by the two accumulator paths.

FIG. 4 also illustrates another embodiment of the hydraulic cylinder steering means in which only one telescopic cylinder is used on each side of the vehicle pivot attachment. In this particular system, pressurized hydraulic fluid emanating from the one partially independent circuit having accumulator 104, is directed by circuit path 112 to metering valve 111. Depending upon which way steering actuation means 121 is adjusted and thus, the way driver 122, and driver linkage 123 is adjusted, the pressurized fluid is directed to cylinder 119, for example, by circuit path 116, or circuit path 115.

When the pressurized fluid is directed by circuit path 116, it activates cylinder 119 to direct piston portion 120 outwardly and thus extend. At the same time, circuit path 109, directing fluid from path accumulator 107, delivers fluid under pressure to metering valve 110. The two valves are synchronized so as to enable circuit 113 to direct fluid to the opposite side of cylinder 117 when circuit 116 delivers fluid to cylinder 119. By such an arrangement, cylinder 119 with piston 120 is extending in synchrony with the contraction of piston 118 within cylinder 117, so as to effectuate a right hand turn of the articulated vehicle. Conversely, when paths 115 and 114 are transmitting hydraulic fluid under pressure to cylinders 119 and 117 respectively, cylinder 119 with piston 120 is contracting while cylinder 117 with piston 118 is extending, so as to accommodate a left hand turn of the articulated vehicle. In an equivalent manner to the previous hydraulic steering system disclosed in FIG. 3, the paths not being used for direct pressurized fluid are utilized to drain off the contained fluid from the telescoping cylinder for return to the metering valves and in turn to the shared portion of the partially independent power circuit path through circuits 92 and 93.

In the circuit path power path embodiment and hydraulic steering means embodiment disclosed in FIG. 4, when failure occurs to either one of the hydraulic steering cylinders or to either one of the independent portions of the power circuit paths, or for that matter, the shared portion of the power circuit path, the independent accumulator means which has not been affected, serves to power at least one of the telescoping cylinders, 117 or 119 to provide effective, though somewhat reduced, steering capability to the articulated vehicle.

The foregoing description and drawings merely explain and illustrate the invention and the invention is not limited thereto, except insofar as the appended claims are so limited, as those skilled in the art who have the disclosure before them will be able to make modifications and variations therein without departing from the scope of the invention.

What is claimed is:

1. A steering system for articulated vehicles having two or more vehicle modules pivotally connected to one another at a pivot attachment, said steering system comprising:
   steering actuation means;
   a plurality of hydraulic telescoping steering means;
   each of said plurality of hydraulic steering means pivotally connecting said two or more vehicle modules and pivotally positioned proximate to said pivot attachment respectively;
   dual fluid control means operably connected to said steering actuation means to control and synchronize the operation of each of said plurality of hydraulic telescoping steering means; and
   two or more hydraulic circuitry path means operably connected with said dual fluid control means,
   a first of said two or more hydraulic circuitry path means powering at least one of said plurality of hydraulic steering means proximate to said pivot attachment, and a second of said two or more hydraulic circuitry path means powering at least a second of said plurality of hydraulic steering means proximate to said pivot attachment, thereby providing independent hydraulic power means among said hydraulic telescoping steering means which are synchronized through said dual fluid control means to cooperate with one another to in turn effectuate steering of said articulated vehicle,
   said two or more hydraulic circuitry paths comprising a dual circuit fluid power system, each circuit of which is operably connected to one of said dual fluid control valves respectively so as to power said respective hydraulic telescoping steering means;
   said plurality of hydraulic steering means comprising four hydraulic double-acting cylinders;
   a first and second of said four double-acting cylinders positioned on first and second sides respectively of said pivot attachment and powered by said first hydraulic circuitry path means;
   a third and fourth of said four hydraulic double-acting cylinders positioned on said first and second sides respectively of said pivot attachment and powered by said second hydraulic circuitry path means.

2. A steering system for articulated vehicles having two or more vehicle modules pivotally connected to one another at a pivot attachment, said steering system comprising:
   steering acutation means;
   a plurality of hydraulic telescoping steering means;
   each of said plurality of hydraulic steering means pivotally connecting said two or more vehicle modules and pivotally positioned proximate to said pivot attachment respectively;
   dual fluid control means operably connected to said steering actuation means to control and synchronize the operation of each of said plurality of hydraulic telescoping steering means;
   two or more hydraulic circuitry path means operably connected with said dual fluid control means,
   a first of said two or more hydraulic circuitry path means powering at least one of said plurality of hydraulic steering means proximate to said pivot attachment, and a second of said two or more hydraulic circuitry path means powering at least a second of said plurality of hydraulic steering means proximate to said pivot attachment, thereby providing independent hydraulic power means among said hydraulic telescoping steering means which are synchronized through said dual fluid control means to cooperate with one another to in turn effectuate steering of said articulated vehicle,
   said first of said two or more hydraulic circuitry path means also powering a third hydraulic steering means proximate said pivot attachment and said second of said two or more hydraulic circuitry path means also powering a fourth hydraulic steering means proximate said pivot attachment,
   said plurality of hydraulic telescoping steering means comprising four hydraulic double-acting cylinders,
   a first and second of said four double-acting cylinders positioned on first and second sides respectively of said pivot attachment and powered by said first hydraulic circuitry path means;
   a third and fourth of said four hydraulic double-acting cylinders positioned on said first and second sides respectively of said pivot attachment and powered by said second hydraulic circuitry path means.

3. A steering system for articulated vehicles having two or more vehicle modules pivotally connected to one another at a pivot attachment, said steering system comprising:

steering actuation means;
a plurality of hydraulic telescoping steering means;
each of said plurality of hydraulic steering means pivotally connecting said two or more vehicle modules and pivotally positioned proximate to said pivot attachment respectively;
dual fluid control means operably connected to said steering actuation means to control and synchronize the operation of each of said plurality of hydraulic telescoping steering means;
two or more hydraulic circuitry path means operably connected with said dual fluid control means,
a first of said two or more hydraulic circuitry path means powering at least one of said plurality of hydraulic steering means proximate to said pivot attachment, and a second of said two or more hydraulic circuitry path means powering at least a second of said plurality of hydraulic steering means proximate to said pivot attachment, thereby providing independent hydraulic power means among said hydraulic telescoping steering means which are synchronized through said dual fluid control means to cooperate with one another to in turn effectuate steering of said articulated vehicle,
said hydraulic telescoping steering means comprising two hydraulic double-acting cylinders;
a first of said two double-acting cylinders positioned proximate said pivot attachment and powered by said first hydraulic circuitry path means;
a second of said two hydraulic double-acting cylinders positioned proximate said pivot attachment and powered by said second hydraulic circuitry means;
each of said first and second hydraulic cylinders havig a piston end and a rod end therewithin and being of a relatively substantial size so as to enable steering of the vehicle by only one of said cylinders when the independent hydraulic circuitry path means powering the other of said cylinders fails to power said other cylinder,
said hydraulic telescoping steering means further comprising one or more substantially small assist-cylinders to compensate for said first or second double-acting cylinder when said first or second cylinder are being displaced at their respective rod end.

4. A steering system for articulated vehicles having two or more vehicle modules pivotally connected to one another at a pivot attachment, said steering system comprising:
steering actuation means;
a plurality of hydraulic telescoping steering means;
each of said plurality of hydraulic steering means pivotally connecting said two or more vehicle modules and pivotally positioned proximate to said pivot attachment respectively;
dual fluid control means operably connected to said steering actuation means to control and synchronize the operation of each of said plurality of hydraulic telescoping steering means;
two or more hydraulic circuitry path means operably connected with said dual fluid control means;
a first of said two or more hydraulic circuitry path means powering at least one of said plurality of hydraulic steering means proximate to said pivot attachment, and a second of said two or more hydraulic circuity path means powering at least a second of said plurality of hydraulic steering means proximate to said pivot attachment, thereby providing independent hydraulic power means among said hydraulic telescoping steering means which are synchronized through said dual fluid control means to cooperate with one another to in turn effectuate steering of said articulated vehicle,
said two or more hydraulic circuitry paths comprising a dual circuit fluid power system, each circuit of which is operably connected to one of said dual fluid control means respectively so as to power said respective hydraulic telescoping steering means;
each of said circuits of said dual circuit system independently operable of the other thereby providing to said steering system emergency back-up and auxiliary steering power; and
each of said circuits comprising reservoir means, pump means and accumulator means operably connected into a series fluid circuit arrangement.

5. The invention according to claim 4 in which said hydraulic telescoping steering means comprises two hydraulic double-acting cylinders;
a first of said two double-acting cylinders positioned proximate said pivot attachment and powered by said first hydraulic circuitry path means;
a second of said two hydraulic double-acting cylinders positioned proximate said pivot attachment and powered by said second hydraulic circuitry means;
each of said first and second hydraulic cylinders having a piston end and a rod end therewithin and being of a relatively substantial size so as to enable steering of the vehicle by only one of said cylinders when the independent hydraulic circuitry path means powering the other of said cylinders fails to power said other cylinder.

6. The invention according to claim 4 in which each of said plurality hydraulic telescoping steering means comprises a double-acting telescoping cylinder.

7. The invention according to claim 4 in which each of said two or more hydraulic circuit path means has warning indicator means associated therewith to apprise a user of said vehicle of malfunctions and failures of each said circuit path means in operation with said hydraulic telescoping steering means.

8. The invention according to claim 4 in which said steering actuation means comprises a steering wheel and column assembly.

9. The invention according to claim 4 in which said dual fluid control means comprises two individual metering control valves each operably connected to each of said hydraulic circuitry path means respectively, and in turn to said hydraulic telescoping steering means respectively powered by each said hydraulic circuitry path means.

10. The invention according to claim 9 in which each of said two meter control valves are adjoined longitudinally in tandem for simultaneous adjustment by said steering actuation means.

11. The invention according to claim 9 in which each of said two meter control valves are independently positioned alongside one another;
said steering actuation means operably connected to each of said meter control valves through steering divider means interposed therebetween;
said steering divider means communicating adjustment of said steering actuation means to each of said meter control valves to adjust each of said meter control valves simultaneously.

12. The invention according to claim 4 in which each circuit of said dual circuit fluid power system further comprises:
- filter means operably disposed in series arrangement within each said circuit;
- check valve means disposed about said accumulator means to control fluid direction in and out of said accumulator means; and
- pressure relief valve means disposed in parallel with said pump means to protect said pump means in operation.

13. A steering system for articulated vehicles having two or more vehicle modules pivotally connected to one another at a pivot attachment, said steering system comprising:
- steering actuation means;
- a plurality of hydraulic telescoping steering means;
- each of said plurality of hydraulic steering means pivotally connecting said two or more vehicle modules and pivotally positioned proximate to said pivot attachment respectively;
- dual fluid control means operably connected to said steering actuation means to control and synchronize the operation of each of said plurality of hydraulic telescoping steering means; and
- two or more hydraulic circuitry path means operably connected with said dual fluid control means,
- a first of said two or more hydraulic circuitry path means powering at least one of said plurality of hydraulic steering means proximate to said pivot attachment, and a second of said two or more hydraulic circuitry path means powering at least a second of said plurality of hydraulic steering means proximate to said pivot attachment, thereby providing independent hydraulic power means among said hydraulic telescoping steering means which are synchronized through said dual fluid control means to cooperate with one another to in turn effectuate steering of said articulated vehicle,
- said two or more hydraulic circuitry paths comprising a dual circuit fluid power system, each circuit of which is operably connected to one of said dual fluid control valves respectively so as to power said respective hydraulic telescoping means;
- each of said circuits of said dual circuit system being partially independent of the other to thereby provide to said steering system, emergency back-up and auxiliary steering power;
- each of said circuits having independent accumulator means which are operably connected to reservoir means and pump means which are shared between said circuits and connected into a series fluid circuit arrangement with said pump.

14. The invention according to claim 13 in which each circuit of said dual circuit fluid power system further comprises check valve means disposed about said accumulator means to control fluid direction in and out of said accumulator means;
- each said circuit further sharing filter means operably disposed in series arrangement within said dual circuit fluid power system, and pressure relief valve means disposed in parallel with said pump means to protect said pump means in operation.

15. The invention according to claim 13 in which said hydraulic telescoping steering means comprises two hydraulic double-acting cylinders;
- a first of said two double-acting cylinders positioned proximate said pivot attachment and powered by said first hydraulic circuitry path means;
- a second of said two hydraulic double-acting cylinders positioned proximate said pivot attachment and powered by said second hydraulic circuitry means;
- each of said first and second hydraulic cylinders having a piston end and a rod end therewithin and being of a relatively substantial size so as to enable steering of the vehicle by only one of said cylinders when the independent hydraulic circuitry path means powering the other of said cylinders fails to power said other cylinder.

16. The invention according to claim 13 in which each of said plurality of hydraulic telescoping steering means comprises a double-acting telescoping cylinder.

17. The invention according to claim 13 in which each of said two or more hydraulic circuit path means has warning indicator means associated therewith to apprise a user of said vehicle of malfunctions and failures of each said circuit path means in operation with said hydraulic telescoping steering means.

18. The invention according to claim 13 in which said steering actuation means comprises a steering wheel and column assembly.

19. The invention according to claim 13 in which said dual fluid control means comprises two individual metering control valves each operably connected to each of said hydraulic circuitry path means respectively, and in turn to said hydraulic telescoping steering means respectively powered by each said hydraulic circuitry path means.

20. The invention according to claim 19 in which each of said two meter control valves are adjoined longitudinally in tandem for simultaneous adjustment by said steering actuation means.

21. The invention according to claim 19 in which each of said two meter control valves are independently positioned alongside one another;
- said steering actuation means operably connected to each of said meter control valves through steering divider means interposed therebetween;
- said steering divider means communicating adjustment of said steering actuation means to each of said meter control valves to adjust each of said meter control valves simultaneously.

* * * * *

UNITED STATES PATENT AND TRADEMARK OFFICE
CERTIFICATE OF CORRECTION

PATENT NO. : 4,117,905
DATED : October 3, 1978
INVENTOR(S) : Lyle V. Mustered

It is certified that error appears in the above-identified patent and that said Letters Patent are hereby corrected as shown below:

| | |
|---|---|
| Col. 1, line 56 | Change "or" to --of--. |
| Col. 2, line 29 | Change "circuity" to --circuitry--. |
| Col. 8, line 7 | After "67 on" delete "the". |
| Col. 9, line 25 | After "circuit" delete "path". |
| Col. 10, line 24 | Change "acutation" to --actuation--. |

Signed and Sealed this

Sixth Day of February 1979

[SEAL]

Attest:

RUTH C. MASON
Attesting Officer

DONALD W. BANNER
Commissioner of Patents and Trademarks